MULTIPLE CUTTER POWER MOWER
Original Filed Nov. 13, 1956 3 Sheets-Sheet 1
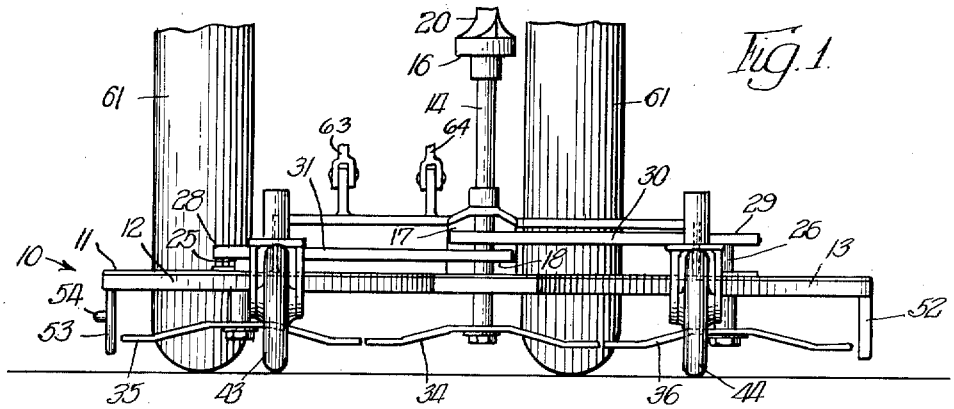
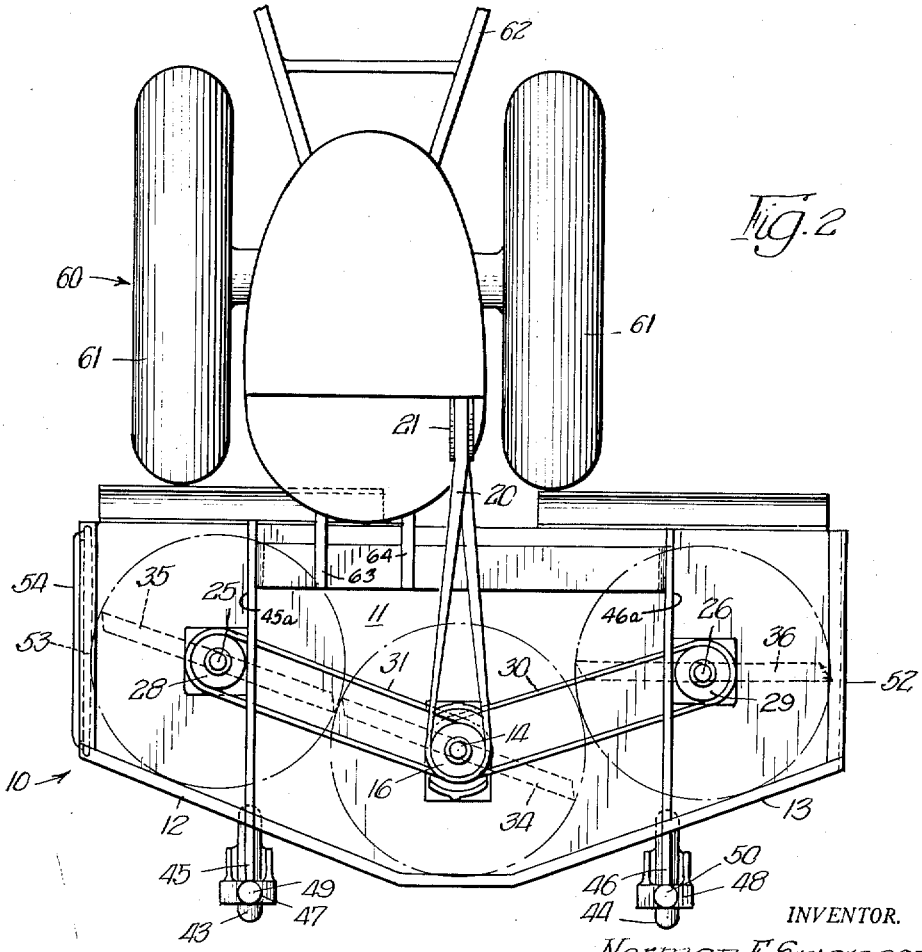
INVENTOR.
Norman F. Swanson,
BY
Wilkinson, Hupley, Byron + Hume.
Attys

MULTIPLE CUTTER POWER MOWER

Original Filed Nov. 13, 1956 3 Sheets-Sheet 2

INVENTOR.
Norman F. Swanson,
BY
Wilkinson, Hufley, Byron & Hume
Attys

MULTIPLE CUTTER POWER MOWER

Original Filed Nov. 13, 1956 3 Sheets-Sheet 3

INVENTOR.
Norman F. Swanson,
BY
Byron, Hume, Gron & Clement
Attys.

United States Patent Office

Re. 25,379
Reissued May 7, 1963

25,379

MULTIPLE CUTTER POWER MOWER

Norman F. Swanson, R.R. 1, Warrenville, Ill.

Original No. 2,870,592, dated Jan. 27, 1959, Ser. No. 621,886, Nov. 13, 1956. Application for reissue Aug. 3, 1962, Ser. No. 215,225
12 Claims. (Cl. 56—25.4)

Matter enclosed in heavy brackets [ ] appears in the original patent but forms no part of this reissue specification; matter printed in italics indicates the additions made by reissue.

This invention relates, as indicated, to rotary mowers, and more particularly to rotary mowers having multiple cutters. Multiple cutters have been used in the past for cutting a wide swath of grass. One problem associated with multiple cutters is mounting them so that they can satisfactorily follow the contour of the ground. This is true in cutting terraces as well as uneven terrain. If the cutters are mounted on a platform which is supported on the ground at its sides, a rise in the contour of the land in the center will cause scalping of the turf in the middle, or, in cutting a terrace, if the platform is supported at the sides, the center will be raised too high, preventing an even cut. Ordinarily the rotary cutting blades have been supported on a frame with wheels mounted to the rear, or to the sides of the cutting blades. One of the reasons for this apparently has been the assumption that if wheels engaged the ground ahead of the cutters, they would lay down a strip of grass in their tracks which would not be cut. Maneuverability is a desirable requirement in any grass mower. In the usual working situation, the mower often must be turned sharply to avoid objects in its path, and, at the same time it is desirable to have good steering control in order to cut as close as possible to such objects so as to avoid leaving uncut edges. Also, it is advantageous if the mower can be completely turned about in a small area, as is often done at the end of a row. In edging cuts where the mower is required to travel over or beyond two levels, such as a driveway, in previous constructions it has been difficult to cut the marginal strip of grass because the wheel at the marginal edge had to be supported outside cutting blade It is, therefore, an object of this invention to provide multiple rotary cutter blades for a power mower that are supported so as to compensate for variations in the contour of the ground, both at the middle and the sides of the swath.

It is another object of the invention to provide multiple cutter blades for a power mower that are supported for maximum maneuverability and/or steering control.

It is a further object of the invention to provide multiple rotary cutters in a power mower that will cut a wide swath and yet can be handled easily with maximum stability.

It is a yet further object of the invention to provide multiple rotary cutter blades for a power mower arranged to follow the contour of a terrace or slope.

It is a still further object of the invention to provide a power mower having multiple cutters which can be inexpensively and conveniently manufactured.

Further objects and advantages of this invention will become evident as the description proceeds and from an examination of the accompanying drawings which illustrate several embodiments of the invention, and in which similar numerals refer to similar parts throughout the several views.

In the drawings:

FIGURE 1 is a front view in elevation of a device embodying the invention.

FIGURE 2 is a plan view of the device shown in FIGURE 1, illustrating diagrammatically a tractor for driving the power mower.

FIGURE 6 is a diagrammatic fragmentary front view showing the rotary cutters edging adjacent a driveway or the like.

Figure 3:
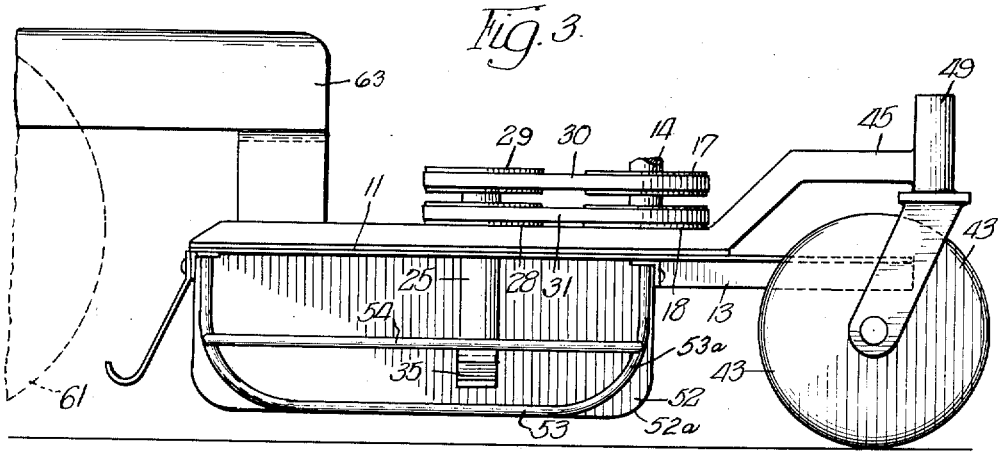
FIGURE 3 is an enlarged fragmentary view in side elevation of the device shown in FIGURE 1.

Referring now to the drawings, the reference numeral 10 indicates generally a device embodying the invention, in which the platform 11 having a pair of swept back leading edges 12, 13 of generally V-shape, with the apex pointed forwardly, supports three rotary cutters. A middle shaft 14 is journaled in the forward portion of the platform along the center line thereof. The middle shaft 14 has at its upper edge and above the platform three pulleys 16, 17 and 18. Pulley 16 is connected by belt 20 (FIGURE 2) to a drive pulley 21 on a tractor. Pulleys 17 and 18 are connected by belts to the other drive shafts.

A pair of outer shafts 25, 26 are journaled in platform 11 at points rearwardly, outwardly, and equidistant from the middle shaft 14. It will be seen that the configuration of the three shafts in the platform is that of an isosceles triangle symmetrically arranged with middle shaft forward of the outer shafts. The upper ends of said outer shafts have affixed thereto pulleys 28, 29 which are connected through suitable belts 30, 31 to pulleys 17, 18 respectively on the middle shaft 14.

Each of the shafts 14, 25, and 26 carries at the underside of said platform cutter blades 34, 35, and 36, respectively, which are all rotated in clockwise direction by the belt and pulley arrangement heretofore described. The blades have a concave middle portion with straight extremities mounted and are rotated in a generally horizontal plane.

Referring now to FIGURE 1, it will be seen that each cutter is mounted so as to overlap the path of the adjacent cutter. All the cutters are positioned in a manner to prevent contacting and damaging one another. By the use of multiple cutters so arranged it is possible to cut a wide swath of grass.

Mounted forwardly of the leading edges 12, 13 of the platform 11 is a pair of wheels 43, 44 adapted to swivel or turn about a vertical axis. The wheels are mounted forwardly of the middle shaft 14 and are spaced apart at a distance less than the distance between the outer shafts 25, 26 and intermediate the outer shafts and middle shaft. The wheels may be allowed to swivel freely, such as castors, or many be connected to a steering mechanism shown in FIGURE 7.

The wheels are journaled for rotational movements about a vertical axis in arched frames 45, 46, as best shown in FIGURES 2 and 3, projecting forwardly of the platform 11 to permit clearance between the wheels and the platform. At the forward ends of the frames 45, 46 are sockets 47, 48 for receiving the vertical spindles 49, 50 of each of the wheels. The frames may have portions extending rearwardly on the platform and secured thereto, as by welding as indicated at 45a, 46a.

Depending from the platform at the sides thereof, outwardly from, and in juxtaposition to, the outer cutters 35, 36, is a pair of relatively long and narrow runners 52, 53, respectively, for engaging the ground in uneven terrain. The runners depend from the platform to a point below the cutters and above the lowest surface of the wheels so as to support the platform, for example, when the wheels enter a dwell or when there is a rise at the sides of the platform. The leading edges of the runners are spaced rearwardly from the ground engaging portions of the wheels, so as to give stability to the platform when the runners engage the ground and to cause the cutters to follow the contour of the ground, for example, in a terrace or slope. Runner 52 may be made of a solid stock of material rounded at the leading edge 52a to cam up the platform over rises. On the other hand, runner 53 preferably should have an opening to permit egress of the cut grass thrown by the cutters. As shown, runner 53 is formed of a bent rod with a rounded leading edge 53a. A safety bar 54 prevents accidental contact by a person through runner 53 with the blades.

The particular arrangement of the wheels and runners combine to prevent scalping of the turf on terraces or uneven terrain. It was discovered that if the wheels were mounted ahead of the cutters, the mower would not leave an uncut strip. By so positioning the wheels ahead of the cutters with the particular location of the runners, the mower obtains stability, steering control, maneuverability, and a tendency to follow the contour of the ground.

The power mower may be driven by a tractor 60, as shown diagrammatically in FIGURE 2, having a pair of drive wheels 61 and control handle 62. The tractor is provided with a drive pulley 21 to which is mounted belt 20 which drives shaft 16, which in turn drives shafts 25, 26. Other types of tractors and drive mechanisms may be employed without departing from the scope of the invention.

The platform 11 is supported at the rear by suitable links 63, 64 between the rearward portion of the platform and the tractor. These links are representative of any suitable mechanism for connecting a tractor to a push type implement. In the operation of the device, the cutters 34, 35, 36, are all rotated in a clockwise direction by the belt and pulley arrangement. The platform 11 is supported by a pair of wheels 43, 44 mounted intermediate the middle and outer shafts which follow the contour of the ground adjacent the center of the platform. Scalping of the ground is thus prevented for any rise in the turf adjacent the center of the platform. Any mounds or rises in the ground adjacent the edges of the platform will be contacted and followed by the runners 52, 53 which will lift the cutters thereover.

Figure 4:
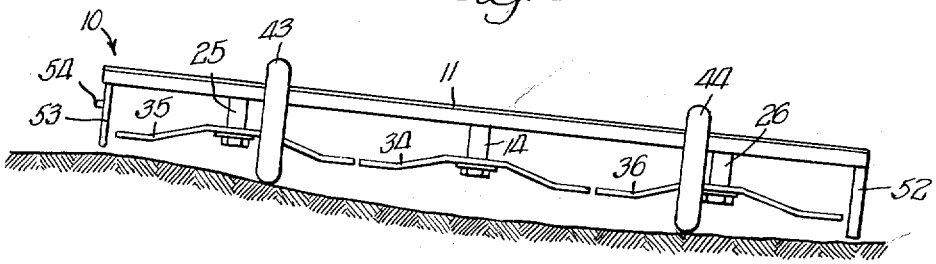
FIGURE 4 is a diagrammatic fragmentary front view illustrating the manner in which the device of the invention supports multiple cutters on a slope or terrace.

As illustrated in FIGURE 4, the wheels 43, 44 and runners 52 and 53 prevent the blades 34, 35 and 36 from scalping the turf on a slope in the terrain. Runners 52 and 53 may engage the ground and support the edges of the platform. Wheels 43, 44 also support the platform intermediate the sides. It will be noted that because the runners 52, 53 at the sides are shorter than and spaced rearwardly from the wheels, the cutters tend to follow the contour of terraced ground. Viewing FIGURES 1, 2, and 4, if a turn is made to the left of the drawing up a slope as shown in FIGURE 4, wheel 43 will turn, being the leading wheel, moving ahead of cutters 34, 35 camming upwardly the middle portion of the platform. However, since runner 53 is shorter than and spaced rearwardly from the wheels, it will delay in engaging the slope, although nearest thereto, thus affording a more even cut by the blades.

Figure 5:
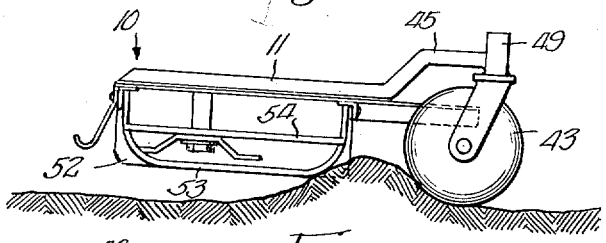
FIGURE 5 is a diagrammatic fragmentary side view showing the multiple cutters being lifted over a rise in uneven terrain.

In FIGURE 5 is shown the manner in which the runners raise the platform and cutters over a rise in the ground. It will be noted that the wheels are ahead of the rise, being on the forward edge of the platform, so that both the wheel and the runner are engaging the ground at spaced points thus giving a stable support to the platform in the lifting action.

Figure 6:
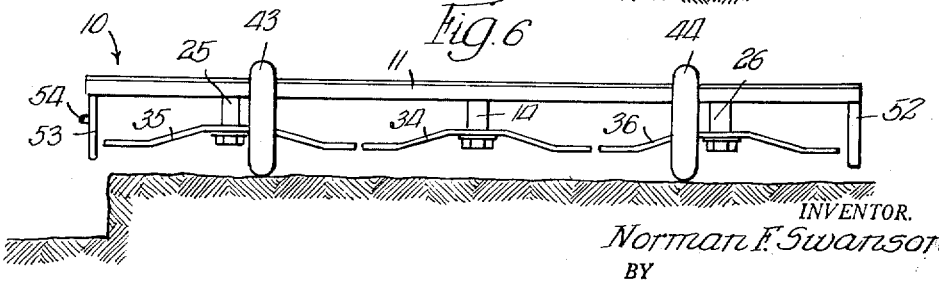

In FIGURE 6 is illustrated the manner in which the rotary mowers of the invention are used to cut grass adjacent to a sharp break in the land, such as a road or ditch. By the invention herein disclosed the rotors overhang the sharp break, so as to not leave an uncut strip.

Figure 7:
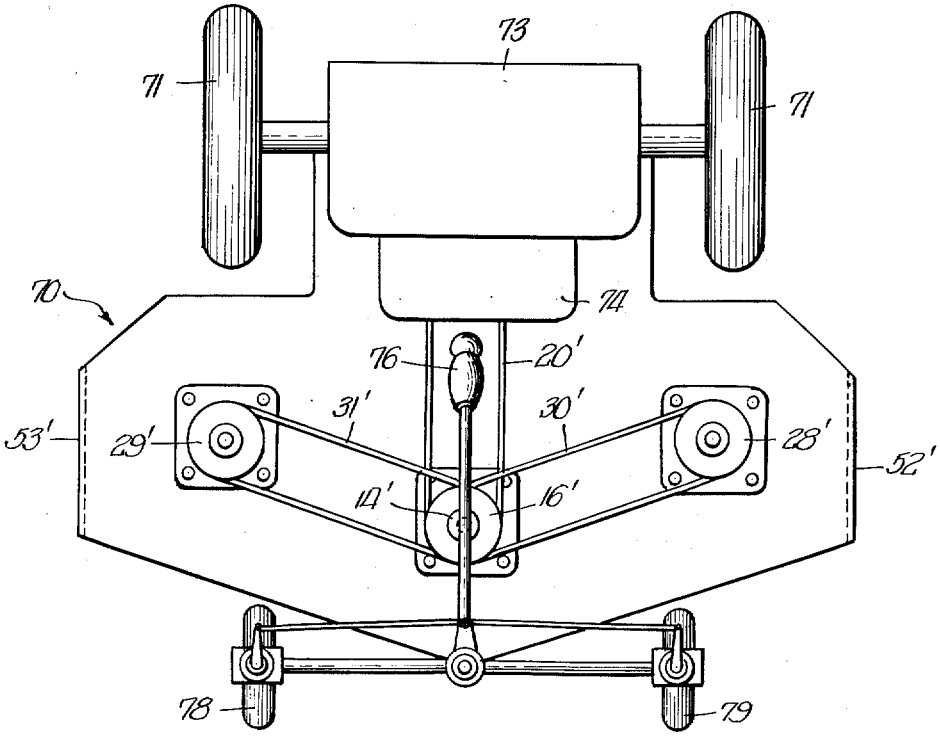
FIGURE 7 is a modified form of the invention employing an alternative type of steering mechanism.

In the alternative device 70, shown in FIGURE 7, the castors are replaced by a steering mechanism having a pair of wheels 78, 79 which is operated by a steering handle 76. The tractor has a pair of drive wheels 71, a seat 73, and a motor and drive mechanism 74. A belt 20' is connected to a drive pulley (not shown) in the motor and drive mechanism 74 and turns shaft 14' through pulley 16'. A pair of belts 30', 31' which are driven by shaft 14' turn pulleys 28', 29'. This belt and pulley arrangement is used to rotate the cutters. Adjacent the sides of the platform are a pair of runners 52', 53' similar to the runners previously described. In this modification the wheels and runners have the same relative mounting arrangement as in the form shown in FIGURES 1–3 so as to prevent undesirable scalping of the turf.

This application is a continuation-in-part of application Serial Number 520,753, filed July 8, 1955, now abandoned.

In the drawings and specification there have been set forth one embodiment of the invention, and although specific terms are employed, they are used in a generic and descriptive sense only and not for purposes of limitation. For example, the wheels may be connected to a suitable steering system controlled by the operator. Also, different types of tractors and power drives may be employed. Further changes in form or in the proportion of parts, as well as the substitution of equivalents are contemplated, as circumstances may suggest or render expedient, without departing from the spirit or scope of this invention as further defined in the following claims.

I claim:

1. In a power mower, a platform, a driven middle shaft journaled in said platform carrying a cutter blade at the underside of said platform, a pair of driven outer shafts journaled in said platform and spaced from said middle shaft carrying cutter blades at the underside of said platform, a pair of castors mounted on said platform forwardly of said middle shaft and between said center shaft and said outer shafts, and a pair of runners mounted at the sides of said platform outside the radius of said cutter blades, said runners depending from said platform to a point above the lowest surface of said castors and to a distance sufficiently below said blades for supporting said platform over uneven ground without allowing scalping of the ground by said blades.

2. In a power mower, a platform having generally V-shaped leading edges, a driven middle shaft journaled in said platform carrying a cutter blade at the underside of said platform, a pair of driven outer shafts journaled in said platform and spaced to each side of said middle shaft carrying cutter blades at the underside of said platform, a pair of castors mounted at said leading edges of said platform forwardly of said center shaft and between said center shaft and said outer shafts, and a pair of runners mounted at the sides of said platform outside the radius of said cutter blades, said runners depending from said platform above the lowest surface of said castors and to a distance sufficiently below said blades for supporting said platform over uneven ground without allowing scalping of the ground by said blades.

3. In a power mower, a platform, a driven middle shaft journaled in said platform carrying a cutter blade at the underside of said platform, a pair of driven outer shafts journaled in said platform and spaced equidistant from said middle shaft carrying cutter blades at the underside of said platform, a pair of castors mounted on said platform and located forwardly of and to both sides of said middle shaft, said pair of castors spaced from each other at a distance less than the distance between said outer shafts, and a pair of runners mounted at the sides of said platform outside the radius of said cutter blades, said runners depending from said platform to a point above the lowest surface of said castors and to a distance sufficiently below said blades for supporting said platform over uneven ground without allowing scalping of the ground by said blades.

4. In a power mower, a platform having a pair of swept back leading edges, a driven middle shaft journaled in said platform carrying a cutter blade at the underside of said platform, a pair of driven outer shafts journaled in said platform and spaced from said middle shaft carrying cutter blades at the underside of said platform, a pair of castors each mounted at one of the leading edges of said platform forwardly of said middle shaft, said castors spaced from each other at a distance less than the distance between said outer shafts, and a pair of runners mounted at the sides of said platform outside the radius of said cutter blades, said runners being long and narrow and depending from said platform to a point above the lowest surface of said castors and to a distance sufficiently below said blades for supporting said platform over uneven ground without allowing scalping of the ground by said blades.

5. In a power mower, a platform, three driven shafts mounted on said platform in the configuration of an isosceles triangle carrying cutter blades, a pair of castors supporting said platform located forwardly of said shafts and intermediate said middle and outer shafts, and runner means mounted at the sides of said platform outside the radius of said cutter blades, said runner means depending from said platform to a point above the lowest surface of said castors and to a distance sufficiently below said blades for supporting said platform over uneven ground without allowing scalping of the ground by said blades.

6. In a power mower, a platform, three driven shafts mounted on said platform in the configuration of an isosceles triangle carrying cutter blades, a pair of castors supporting said platform located forwardly of said shafts and intermediate said middle and outer shafts, and runner means mounted adjacent the sides of said platform outside the radius of said cutter blades, said runner means being relatively long and narrow with an inclined leading edge and depending from said platform to a point above the lowest surface of said castors and to a distance sufficiently below said blades for supporting said platform over uneven ground without allowing scalping of the ground by said blades.

7. In a power mower, a platform, three driven shafts symmetrically mounted on said platform in the configuration of an isosceles triangle carrying cutter blades, a pair of castors supporting said platform located forwardly of said shafts, and runner means mounted adjacent the sides of said platform outside the radius of said cutter blades, said runner means depending from said platform to a point above the lowest surface of said castors and to a distance sufficiently below said blades for supporting said platform over uneven ground without allowing scalping of the ground by said blades.

8. In a power mower, a platform, a middle shaft journaled in said platform carrying a cutter blade at the underside of said platform, a pair of driven outer shafts journalled in said platform and spaced on to each side and rearwardly from said middle shaft carrying cutter blades at the underside of said platform, a pair of wheels for supporting said platform each mounted for swivel movements about a vertical axis and located forwardly of said cutter blades, said wheels spaced from each other at a distance less than the distance between said outer shafts, and long and narrow runners mounted at the sides of said platform outside the radius of said cutter blades, said long and narrow runners depending from said platform to a point above the lowest surface of said wheels and to a distance sufficiently below said blades for supporting said platform over uneven ground without allowing scraping of the ground by said blades.

9. In a power mower, a platform, a plurality of shafts journaled on said platform, cutter blades carried by said shafts below said platform, a pair of wheels for supporting said platform each mounted on vertical shafts journaled for swivel movements about a vertical axis directly forward of said cutter blades, said wheels spaced from each other at a distance less than the distance between outer edges of said cutter blades, and a pair of long and narrow runners mounted at the sides of said platform outside the radius of said cutter blades, said long and narrow runners depending from said platform to a point above the lowest surface of said wheels and to a distance sufficiently below said blades for supporting said platform over uneven ground without allowing scraping of the ground by said blades.

10. In a power mower, a platform, multiple rotary [cutters] *cutter blades* mounted on said platform, a pair of *spaced* wheels for supporting said platform located directly forward of said [cutters] *blades* and inside the outer edges of said [cutters] *blades, each of said wheels pivotably mounted about a vertical axis,* and a pair of runners mounted at the sides of said platform *laterally beyond said wheels, said runners having attachment portions secured to said platform* outside *of the circular areas defined by* the radius of said [cutter] blades, said runners *having long narrow ground engaging portions* depending from said platform to a point above the lowest surface of said wheels and to a distance sufficiently below said blades for supporting said platform over uneven ground without allowing scraping of the ground by said blades.

11. In a power mower, a platform, a driven middle shaft journaled on said platform and carrying a cutter blade at the underside of said platform, a pair of driven outer shafts journalled in said platform spaced from said middle shaft carrying cutter blades at the underside of said platform, a pair of wheels for supporting said platform journaled for rotation about a vertical axis each located forwardly of said middle shaft and spaced from each other at a distance less than the distance between said outer shafts, and long and narrow runners mounted at the sides of said platform outside the radius of said cutter blades depending from said platform to a point above the lowest surface of said wheels and to a distance sufficiently below said blades for supporting said platform over uneven ground without allowing scraping of the ground by said blades, said long and narrow runners spaced rearwardly from the ground engaging portion of said wheels.

*12. In the power mower of claim 10, a steering mechanism for pivoting said wheels about their vertical axes.*

References Cited in the file of this patent or the original patent

UNITED STATES PATENTS

| | | |
|---|---|---|
| 2,114,096 | Noel | Apr. 12, 1938 |
| 2,621,457 | Rosenberg | Dec. 16, 1952 |
| 2,675,661 | Titzer | Apr. 20, 1954 |
| 2,688,833 | Weiss et al. | Sept. 14, 1954 |
| 2,734,326 | Gebhart | Feb. 14, 1956 |
| 2,743,567 | Martin | May 1, 1956 |